United States Patent Office 3,374,059
Patented Mar. 19, 1968

3,374,059
PREPARATION OF NITROSYL ACID SULFATE
Louis Linguenheld, St-Genis Laval, Rhone, and Philippe Perras, Lyon, Rhone, France, assignors to Rhone-Poulenc S.A., Paris, France, a corporation of France
No Drawing. Filed Mar. 16, 1964, Ser. No. 352,356
Claims priority, application France, Apr. 9, 1963, 930,947
2 Claims. (Cl. 23—139)

ABSTRACT OF THE DISCLOSURE

Nitrosyl acid sulphate is prepared by the reaction under anhydrous conditions at $-5°$ to $+5°$ C. of sulphur dioxide with nitric acid in the presence of a chlorinated aliphatic hydrocarbon diluent.

---

This invention relates to the production of nitrosyl acid sulphate, which is generally employed in solid form or as a solution in concentrated sulphuric acid.

It is known to produce nitrosyl acid sulphate by the reaction of sulphur dioxide with nitric acid in accordance with the reaction:

$$SO_2 + HNO_3 \rightarrow (NO)HSO_4$$

The sulphur dioxide is introduced into concentrated or fuming nitric acid maintained at a low temperature. The nitrosyl acid sulphate crystallises out in the reaction mass, which rapidly becomes so thick that the reaction cannot proceed to completion. The nitrosyl acid sulphate, which is separated by filtration, must be freed from nitric acid by washing with acetic acid and carbon tetrachloride, and the pure product is obtained in a yield of 70%, based on the nitric acid employed [Piercey, Ward, J. Chem. Soc., 3842 (1962)]. If a solution of nitrosyl acid sulphate in sulphuric acid is required, the crude crystals of nitrosyl acid sulphate are dissolved in sulphuric acid. The crude crystals carry with them a quantity of nitric acid which has to be eliminated by a current of dry air passed through the solution while it is heated on a water bath (Inorganic Syntheses, 1, p. 55).

The process of the invention for the production of nitrosyl acid sulphate comprises reacting sulphur dioxide with nitric acid in the presence of an inert, liquid organic diluent.

It has been found that in the presence of such a diluent, the nitric acid is completely converted into substantially pure nitrosyl acid sulphate containing no nitric acid or only traces thereof. As the organic diluent, there may be employed any solvent which is inert to the particularly reactive starting materials and products of the reaction and which remains liquid at the temperature of the reaction, usually about 0° C. Chlorinated aliphatic hydrocarbon solvents may be used, e.g. chloroform, dichloroethane and especially carbon tetrachloride. The diluent is added to the reaction mixture either at the beginning of the reaction or when the formation of nitrosyl acid sulphate has become considerable. The reaction is continued until the absorption of sulphur dioxide ceases, and no further free nitric acid remains in the mixture. The nitrosyl acid sulphate crystals are then separated, and a product melting at 73° C. is at once obtained. If a solution in sulphuric acid is required, concentrated sulphuric acid may be added to the suspension of nitrosyl acid sulphate in the organic diluent. The nitrosyl acid sulphate dissolves, and two layers are formed, which are readily separated to give the required sulphuric acid solution. Owing to the absence of nitric acid, no subsequent treatment of the solution is necessary.

To obtain good yields and to avoid decomposition of the nitrosyl acid sulphate, the reaction must take place at a temperature of $-5°$ to $+5°$ C. and under anhydrous conditions. For this purpose, it is necessary on the one hand to cool the reaction mixture vigorously throughout the operation, and on the other to use only anhydrous reactants. Thus, only pure or fuming nitric acid must be used, and if the sulphur dioxide contains traces of moisture it must be dried, for example over concentrated sulphuric acid. When considerable quantities of nitric acid are treated, it is possible, for convenience in handling, to add the nitric acid in a number of successive portions.

The reaction of the sulphur dioxide with the nitric acid may be initiated by the addition, before the start of the reaction, of a catalytic quantity of nitrosyl acid sulphate.

The following example illustrates the invention.

Example

Into a 3-litre, round-bottomed flask provided with a vigorous stirring system, a reflux condenser and a gas inlet in the base, are introduced 465 g. of 97% nitric acid (7.15 moles of $HNO_3$) and 2 g. of crystalline nitrosyl acid sulphate. While the flask is externally cooled at about $-20°$ C. to obtain an internal temperature of about 0° C., and the stirrer is operated, a current of sulphur dioxide is introduced into the flask, the rate of supply being adjusted so that 100–140 g. of gas are absorbed per hour. When about 40% of the initial nitric acid have been converted, the supply of gas is slowed down and a further 256 g. of 97% nitric acid (3.95 moles of $NHO_3$) is introduced into the reaction mass. The gas supply is then restored to its initial rate until the conversion of nitric acid reaches about 40%. The same operation is repeated, 331 g. of 97% nitric acid (5.1 moles) being added to the reaction mass. 1052 g. of 97% nitric acid (16.2 moles) are thus used, of which 40% are converted into nitrosyl acid sulphate. 1050 cc. of carbon tetrachloride are then added, and the passage of sulphur dioxide is resumed. The absorption stops when 1020 g. of sulphur dioxide have been introduced. A suspension of white crystals of nitrosyl acid sulphate in carbon tetrachloride is obtained. By filtration and drying in vacuo, 1972 g. of pure nitrosyl acid sulphate are obtained. The yield is 95.8% based on the nitric acid used, and 97.4% based on the sulphur dioxide consumed.

By similar procedure, a suspension of 596 g. of nitrosyl acid sulphate in 500 cc. of carbon tetrachloride is prepared. 580 g. of 100% sulphuric acid are then added to the reaction mass. The nitrosyl acid sulphate dissolves in the sulphuric acid, and the carbon tetrachloride is separated and recovered in toto. A solution containing about 50% by weight of nitrosyl acid sulphate in sulphuric acid is thus obtained, which can be used directly for certain reactions, such as the conversion of cycloalkanecarboxylic acids into lactams.

We claim:
1. Process for the production of nitrosyl acid sulphate which comprises passing sulphur dioxide into an anhydrous mixture of nitric acid and a chlorinated aliphatic hydrocarbon at $-5°$ to $+5°$ C. until absorption of sulphur dioxide ceases, and separating the crystals of nitrosyl acid sulphate formed from the reaction medium.
2. Process according to claim 1 in which the diluent is carbon tetrachloride.

References Cited

UNITED STATES PATENTS 3,149,913    9/1964    Ferstandig et al. _____ 23—139

OTHER REFERENCES

Piercey et al.: "Journal of the Chemical Society," London, September 1962, pp. 3841 to 3843.

OSCAR R. VERTIZ, Primary Examiner.
H. T. CARTER, Assistant Examiner.